United States Patent [19]

Lapeyre et al.

[11] Patent Number: 5,004,095
[45] Date of Patent: * Apr. 2, 1991

[54] APPARATUS FOR USE IN VARIABLE OPERATING TEMPERATURES

[75] Inventors: James M. Lapeyre, New Orleans; Peter G. Weber, LaPlace; Christopher G. Greve, Covington, all of La.

[73] Assignee: The Laitram Corporation, New Orleans, La.

[*] Notice: The portion of the term of this patent subsequent to Sep. 25, 2007 has been disclaimed.

[21] Appl. No.: 352,666

[22] Filed: May 9, 1989

Related U.S. Application Data

[63] Continuation of Ser. No. 58,917, Jun. 5, 1987, abandoned.

[51] Int. Cl.5 .............................................. B65G 33/32
[52] U.S. Cl. ...................................... 198/660; 198/677
[58] Field of Search ............... 198/660, 666, 667, 671, 198/672, 674, 676, 677, 659, 662, 664; 403/297

[56] References Cited

U.S. PATENT DOCUMENTS

| | | | |
|---|---|---|---|
| 1,829,453 | 10/1931 | Parker | 198/677 |
| 2,226,078 | 12/1940 | Spahn | 403/297 X |
| 2,571,036 | 10/1951 | Heyne et al. | 198/676 X |
| 2,588,901 | 3/1952 | Weikart | 198/666 X |
| 2,721,647 | 10/1955 | Witworth | 198/666 |
| 3,104,757 | 9/1963 | Dougherty et al. | 198/666 |
| 3,194,385 | 7/1965 | Barnese | 198/672 X |
| 3,323,781 | 6/1967 | Murdock | 403/297 X |
| 3,333,873 | 8/1967 | Triplett | 403/297 X |
| 3,664,444 | 5/1972 | Henson | 198/666 |
| 3,705,644 | 12/1972 | Kawchitch | 198/671 X |
| 4,078,276 | 3/1978 | Nunes | 403/297 X |
| 4,152,086 | 5/1979 | Achenbach et al. | 403/297 X |
| 4,691,818 | 9/1987 | Weber | 198/677 X |

FOREIGN PATENT DOCUMENTS 2844717 4/1979 Fed. Rep. of Germany ...... 198/674

Primary Examiner—H. Grant Skaggs
Assistant Examiner—Dean A. Reichard
Attorney, Agent, or Firm—Laurence R. Brown

[57] ABSTRACT

Conveying apparatus for use in an environment having significant variations in temperature, and having a molded plastic screw conveyor on a metal drive shaft is disclosed. The molded plastic screw conveyor includes a non-circular axial aperture which receives a cooperating drive shaft with a coefficient of expansion different than the plastic screw conveyor. The cross-sectional shapes of the drive shaft and the axial aperture extending through the plastic screw conveyor are such that rotation of the drive shaft results in rotation of the plastic screw conveyor. However, axial motion between the plastic screw conveyor and the drive shaft can occur to accommodate variations in length due to changes in temperature. A journal plug or end means is also included which may receive rotational forces from a motor or other source. The journal plug is joined to the drive shaft such that rotation of the journal plug results in rotation of the drive shaft and consequently in rotation of the plastic screw conveyor.

12 Claims, 6 Drawing Sheets

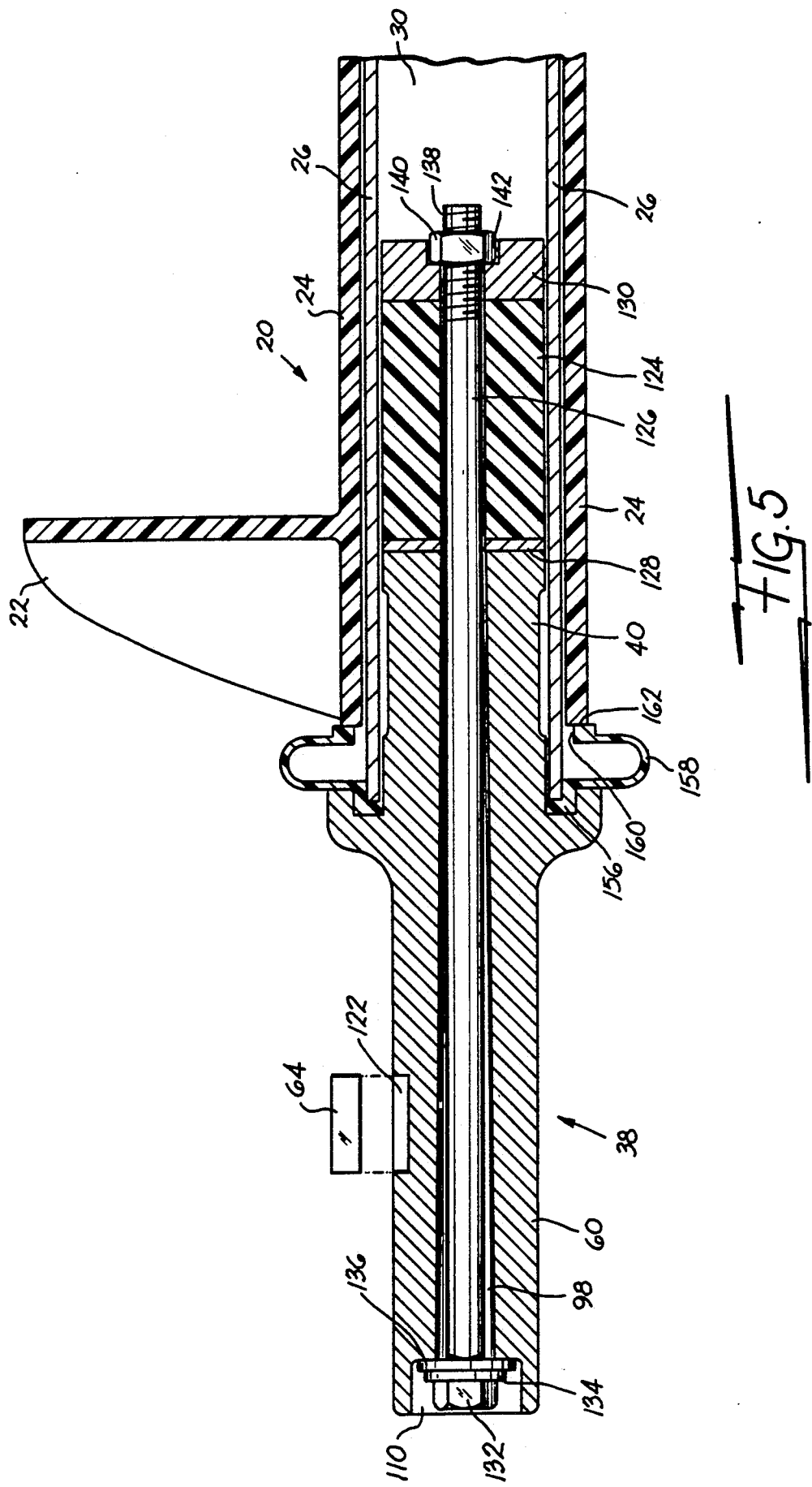

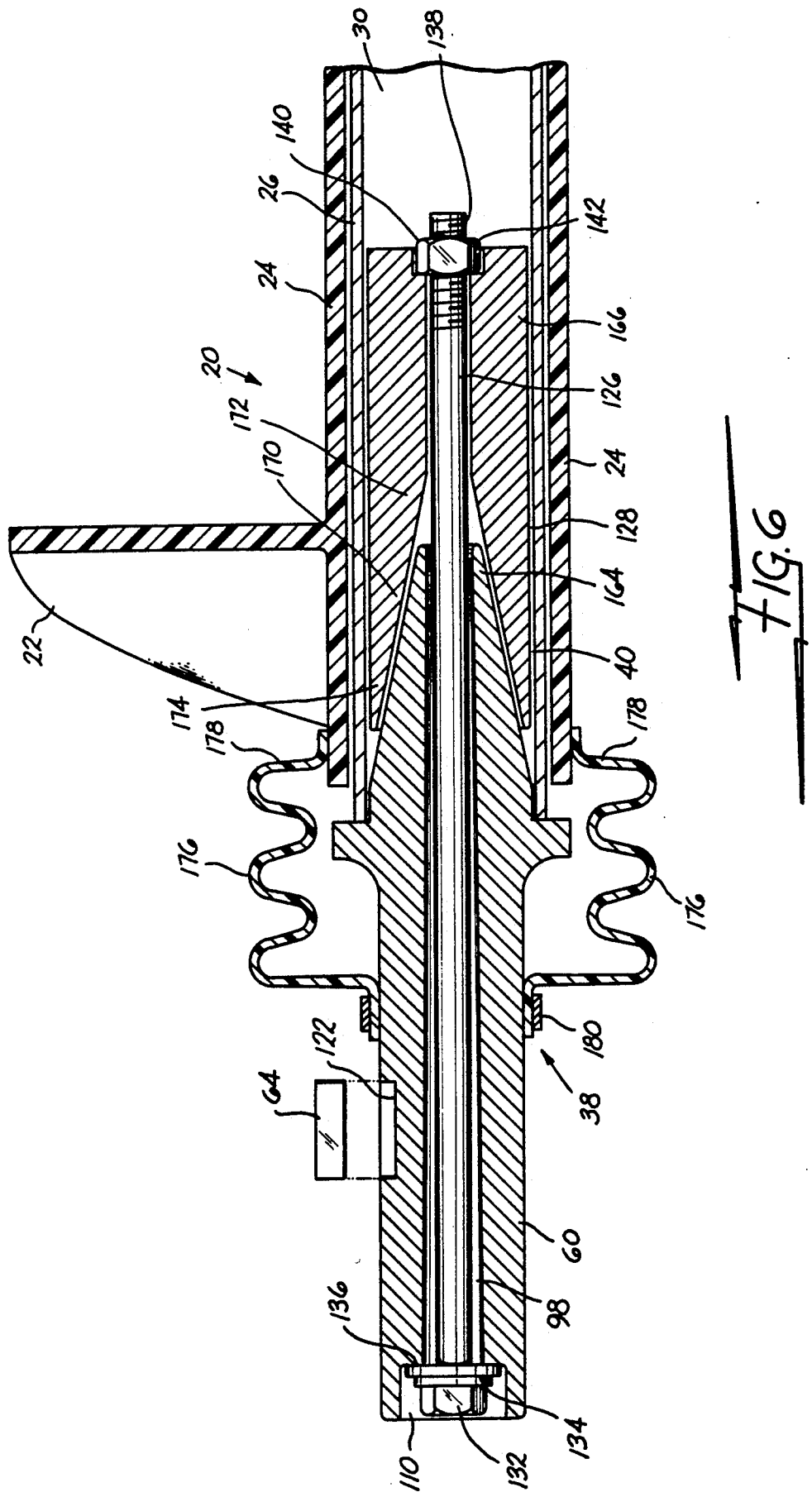

APPARATUS FOR USE IN VARIABLE OPERATING TEMPERATURES

This application is a continuation of application Ser. No. 58,917, filed June 5, 1987, now abandoned.

TECHNICAL FIELD

This invention relates to plastic screw conveyors, and more particularly to screw conveyor apparatus for use in environments having significant temperature variations. The components of the apparatus are protected and located within the drive shaft itself and are particularly suitable for use in applications where the U.S.D.A. has set strict requirements.

BACKGROUND ART

This application has related subject matter to that of the copending U.S. application Ser. No. 822,641 filed Jan. 27, 1986. It also has subject matter related to the U.S. copending application Ser. No. 044,358 filed Apr. 30, 1987, and copending application Ser. No. 058,393 entitled "Screw Conveyor Coupling Apparatus" and filed the same date as this application by the Assignee of the present invention.

As will be appreciated by those skilled in the art, specialized helical shaped devices such as screw conveyors are well known for the transport of various types of bulk material. Such conveyors generally include a helical shaped member which rotates within a housing or trough such that rotation of the screw conveyor along its longitudinal or central axis results in movement of the bulk material along the length of the device. In the past, such conveyors were typically constructed from metal, and each conveyor was specifically designed for a particular purpose and of a particular length. However, although most prior art conveyors were specifically designed to meet a particular application, there have been some attempts of providing a modular type conveyor of metal and wood. Examples of U.S. Patents which disclose such modular conveyors include U.S. Pat. No. 349,233 issued to James Nelson on Sept. 10, 1886; U.S. Pat. No. 455,384 issued to H. Binkholz on July 7, 1891; U.S. Pat. No. 525,194 issued to J. Dyson, et al on Aug. 20, 1894; U.S. Pat. No. 546,879 issued to J. Dyson, et al on Sept. 14, 1895; U.S. Pat. No. 1,867,573 issued to D. G. Leach on July 19, 1932; U.S. Pat. No. 2,492,915 issued to A. B. Carlson on Dec. 27, 1949; U.S. Pat. No. 3,648,826 issued to Dean P. Brooks on Mar. 14, 1972 and U.S. Pat. No. 3,705,644 issued to Claude E. Kawchitch on Dec. 12, 1972. However, a study of the above patents indicates that only the two Dyson, et al patents, the Nelson patent and the Kawchitch patent can be considered sectional or modular. In addition, the assignee of the present application filed an application for Letters Patent on Sept. 29, 1983 for a "Modular Screw Conveyor" and which has Ser. No. 537,345, and on Apr. 4, 1984 filed an application for "Mold and Process for Manufacturing Helical Shaped Items" which has Ser. No. 598,374.

As will be appreciated, one of the advantages of a plastic screw conveyor is its ease of cleaning, etc. due to the smooth and non-interrupted surfaces. Also, of course, it will be appreciated that by avoiding nuts and bolts which penetrate through the plastic screw conveyor and drive shaft, the conveying apparatus can be kept clean and free of debris, and corrosion of the drive shaft substantially prevented. In addition, for certain U.S.D.A. applications the screw conveyor apparatus must be sealed so as to eliminate any cavities etc. which might harbor bacteria. For such applications, a unitary drive shaft was normally necessary no matter how long the screw conveyor, since shaft couplings available at that time which used sleeves and bolts were unacceptable and would not provide the uninterrupted and crevice-free surfaces.

However, since many screw conveyor applications must operate over a wide range of temperatures, it has been discovered that the different coefficients of exposition of the metal drive shaft and the plastic screw conveyor may cause serious operational problems in such applications. In addition, the problems become even more serious in those applications which must meet U.S.D.A. strict requirements.

Therefore, it is an object of the present invention to provide screw conveyor apparatus which can operate satisfactorily over a wide variation of temperatures.

It is another object of the present invention to provide a screw conveyor apparatus which can operate over a wide variation of temperatures while maintaining the metal drive shaft in a sealed and protected condition with respect to the exterior of the screw conveyor apparatus.

It is yet another object to provide a screw conveyor apparatus suitable for use over a wide variation of temperatures which is inexpensive and easy to manufacture.

SUMMARY

These and other objects and advantages will be obvious and will in part appear hereinafter, and will be accomplished by the present invention which provides conveyor apparatus including a molded plastic screw conveyor having an axial member and a flight member helically encircling the axial member for use in an environment having variable temperatures.

The molded plastic screw conveyor is made of a material having a first known coefficient of expansion, and the axial member defines a non-circular aperture extending between the two extreme ends. The screw conveyor slides over a drive shaft which has a length selected to be similar to that of the screw conveyor axial member and which is made of a material having a coefficient of expansion different from the plastic screw conveyor, such as for example metal. The outside perimeter of the drive shaft cooperates with the aperture of the plastic screw conveyor such that although rotational movement of the drive shaft results in rotation of the plastic screw conveyor, limited axial motion resulting from variation in length due to changes in temperature can occur. The drive shaft also includes a journal plug or end means mounted at least at one of its two ends, and a retainer means cooperating with the journal plug to keep the journal plug secured to the drive shaft. There is also included means for imparting rotational movement to the journal plug and consequently to the drive shaft and plastic screw conveyor.

BRIEF DESCRIPTION OF THE DRAWINGS

The above features of the present invention will be more clearly understood from consideration of the following description in connection with the accompanying drawings in which;

FIGS. 2, 2A and 2B show an assembled partially plan and partially cross-sectional view and two opposing end views of an embodiment of the invention illustrating a drive shaft supporting a plastic screw cxonveyor in a manner such that the plastic screw conveyor is free to move axially with respect to the drive shaft in response to different expansion rates due to temperature changes.

FIG. 5 is still another embodiment of conveying apparatus incorporating the features of the present invention.

FIG. 6 is another embodiment of conveying apparatus showing a different sealing technique and journal plug.

BEST MODE OF CARRYING OUT THE APPLICATION

Figure 1:
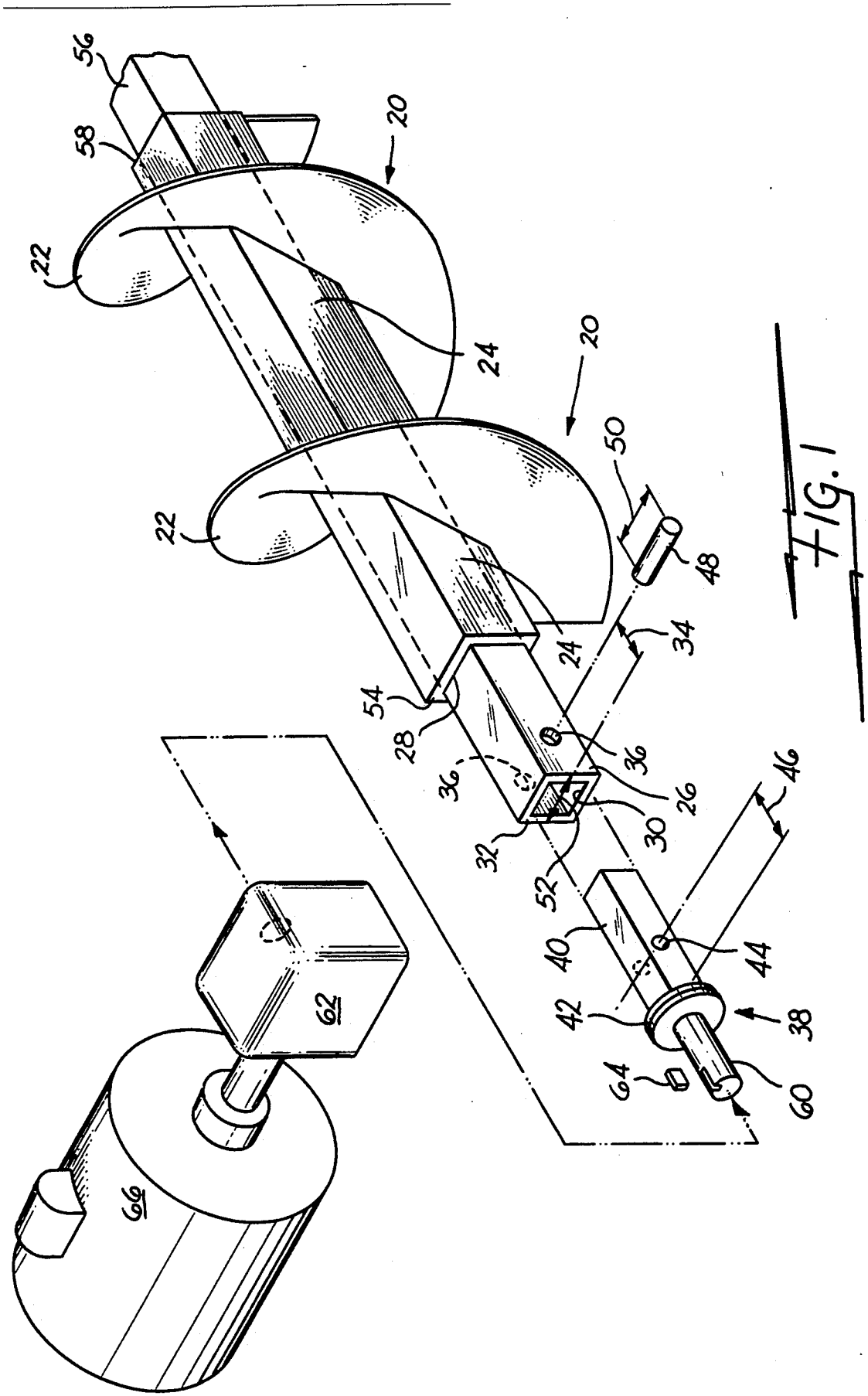
FIG. 1 is an exploded perspective view of typical molded plastic screw conveyor apparatus showing a drive motor, a journal plug, a metal drive shaft and the plastic screw conveyor.

Referring now to FIG. 1, there is shown a perspective exploded view of the coupling system of this invention. As shown, plastic screw conveyor includes a flight member 22 which helically encircles the axial member 24 and extends between the two ends of the axial member. Drive shaft 26 which has a non-circular cross-section is suitable for being received in a non-circular aperture 28 located in the plastic screw conveyor 20. Also, shown, drive shaft 26 has a outside non-circular cross-sectional area which is substantially the same as the through the axial member 24 of the plastic screw conveyor 20. It will be appreciated, however that although the outside perimeter or cross-section of drive shaft 26 and the cross-section of the axial aperture 28 of the plastic screw conveyor 20 is substantially the same in the embodiment shown in FIG. 1, it would be possible to use a drive shaft which would cooperate with the aperture of the plastic screw conveyor but not have precisely the same shape. For example, the aperture of a plastic conveyor shown in the Kawchitch patent is not identical to a drive shaft which is received by the module. It can further be seen that the drive shaft 26 itself also defines a longitudinal or axial aperture 30 which extends from the second end 32 toward the second end of the drive shaft. Although typically the drive shaft 26 will be completely hollow and the aperture 30 will extend completely from one end to the other, it will be appreciated that the aperture 30 could extend a short distance along the longitudinal axis and the remainder of the drive shaft could be solid. Spaced a selected distance from the first end 32 of drive shaft 26, and as indicated by double-headed arrow 34, there is a second aperture 36 which is perpendicular to the longitudinal axis of the drive shaft and as shown extends perpendicular through the drive shaft. As can be seen, the portion of the aperture 36 defined by one of the four sides of the square shaped drive shaft 26 is in alignment with the portion of the aperture 36 defined in an opposing side of the drive shaft.

Also, a journal plug shown generally at 38 includes a first or connecting end 40 which has a shape suitable for being slidably received by aperture 30 of drive shaft 26. In the embodiment shown, the end 40 of journal plug 38 is generally of a square cross-sectional area similar to that of the aperture 30 cross-section except that the edges have been rounded off to allow for an easier fit. It will be appreciated of course that the end 40 could have an outside diameter cross-sectional shape which is precisely the same as that although slightly smaller than the aperture 30. Spaced from end 40 of journal plug 38 is a center band member 42 which has a sufficiently large radius such that band 42 cannot slide into aperture 28 of plastic screw conveyor 20. Also as shown, journal plug 38 defines an aperture 44 which is spaced from the center band member by a distance indicated by double-headed arrow 46 which distance is substantially the same as the distance indicated by double-headed arrow 34. Thus, it will be appreciated that when end 40 is located or positioned within aperture 30 of drive shaft 26, such that end 32 of the drive shaft is substantially in contact with center band member 42, aperture 44 is substantially in register with aperture 36. It should be noted that aperture 44 is also located perpendicular to the longitudinal axis of coupling member or journal plug 38 to achieve the in register position with the aperture 36. Also as shown, aperture 44 has a diameter substantially the same as that of aperture 36. Thus, when the journal plug 38 is fully inserted within the drive shaft 26, and the aperture 44 is in register with aperture 36, a locking pin 48 which has a diameter slightly smaller than the diameter of the apertures may be inserted in the in-register apertures such that axial movement is prevented. It should also be noted, that the length indicated by double-arrow 50 of locking pin 48 is substantially identical to the width of the drive shaft 26 as indicated by double-headed arrow 52. It will also be appreciated of course that because of the cooperating shapes of end 40 of coupling means 38 and the aperture 30, rotational movement between the two is also prevented. Further, by simply sliding the plastic screw conveyor 20 forward such that end 54 of the plastic screw conveyor is also in contact with center ring 42 of the journal plug 38, it will be appreciated that locking pin 48 will be prevented from moving out of the apertures and thus the coupling is substantially enclosed and locked in place. To allow for different expansion rates of the metal drive shaft 26 and the plastic screw conveyor 20, it will be appreciated that whereas end 54 of the plastic screw conveyor 20 is in contact with band member 42, there is no such restraint at the opposite end 56 of drive shaft 26 and consequently end 58 of the plastic screw conveyor 20 is free to move axially with respect to end 56 of drive shaft 26. Also, it will appreciated that in the arrangement shown, the metal drive shaft and journal plug can be protected from corrosive materials.

As shown, the end 60 opposite end 40 of journal plug 38 may be a keyed round shaft suitable for being connected to a speed reduction box 62 by key 64. Reduction box 62 is in turn connected to a drive motor 66. It will be appreciated of course that instead of being connected to a drive motor by speed reduction box 62 the end 60 could have mounted thereon a pulley and be driven by a belt and the like.

Figure 2:
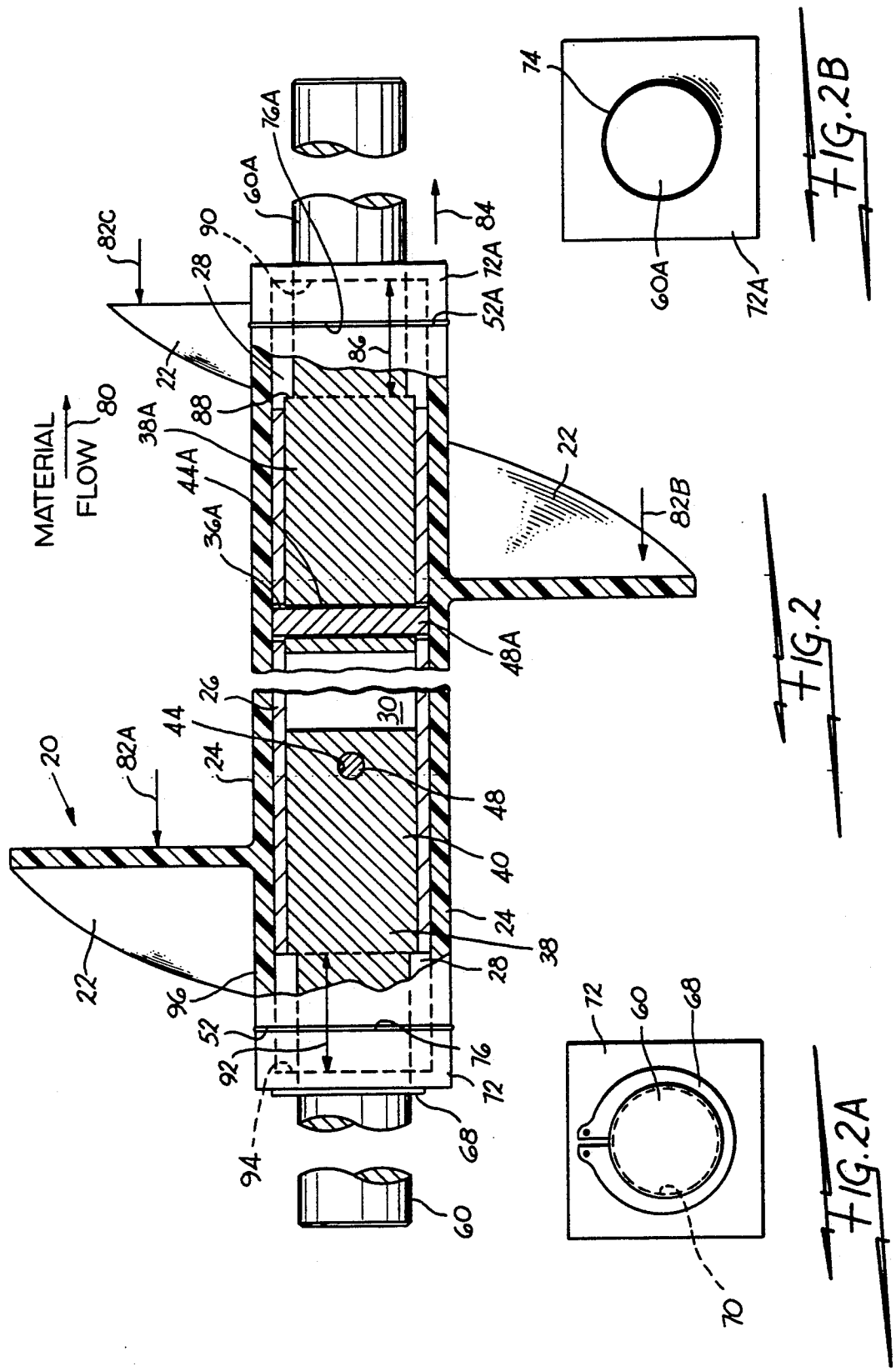

Referring now to FIGS. 2, 2A and 2B there is shown a partially plan and partially cross-sectional view and two opposing end views of another embodiment of the present invention. Those elements or portions of the embodiment of FIG. 2 which are similar or common to the screw conveyor apparatus of FIG. 1 carry the same reference numbers. Also as will become apparent from the discussions of FIGS. 3 through 6, common elements of those embodiments also carry the same reference numbers. As shown, plastic screw conveyor 20 includes axial member 24 which defines aperture 28 extending the length and along the axis of the axial member. Aperture 28 has a non-circular cross-section (such as a square cross-section) suitable for receiving elongated drive shaft 26 having a perimeter cross-section of a cooperative non-circular shape such that rotation of the drive shaft 26 causes rotation of the plastic screw conveyor 20. Although the perimeter or cross-section of the drive shaft may be of any suitable size and shape which cannot freely rotate within aperture 28 of the plastic screw conveyor, typically the perimeter cross-section of the drive shaft will be the same but slightly smaller, than the cross-section of the aperture.

As shown, drive shaft 26 also includes a non-circular aperture 30 which typically extends the length of drive shaft 26. Although not necessary, since drive shaft 26 is normally a square or hexagon tubular member of uniform wall thickness, the non-circular shape of aperture 30 typically will be the same square or hexagon shape, but smaller due to the wall thickness of the drive shaft, as the square or hexagon perimeter cross-section of drive shaft 26. Journal plug 38 includes a mounting end 40 which also has a non-circular shape suitable for being slidably received in a non-rotatable manner by the aperture 30 of drive shaft 26. As was discussed above with respect to the cross-section of aperture 28 of the plastic screw conveyor and the perimeter or cross-section of drive shaft 26, these two cooperating non-circular shapes of aperture 30 of the drive shaft 26 and the cross-section of mounting end 40 of journal plug 38 are usually, but not necessarily, the same. The important consideration is that rotation of journal plug 38 along its longitudinal axis will cause rotation of drive shaft 26 and consequently plastic screw conveyor 20. Drive end 60 typically has a circular cross-section with a keyway (not shown), such that rotational force can be applied to drive end 60 of journal plug 38 by any suitable means such as a gear box or pulley assembly as discussed heretofore with respect to the embodiment of FIG. 1. As was discussed above with respect to FIG. 1, journal plug 38 is maintained in its axial position by means of locking pin 48 which extends through the aperture 36 of drive shaft 26 and the in-register aperture 44 of journal plug 38. The side walls of the axial member 24 of the plastic screw conveyor 20 prevents the locking pin 48 from droping out of the in-register apetures 36 and 44. The method of locking the journal plug in the drive shaft 26 is more clearly portrayed at the right hand side of FIG. 2 wherein the drive shaft 26 and the journal plug 38A are rotated 90°. As is clearly shown, journal plug 38A is maintained in position by locking pin 48A which extends through both aperture 36 of drive shaft 26 and aperture 38A. In addition, it should be noted that the journal plugs 38 and 38A of FIG. 2 do not include a center band member such as shown in FIG. 1. Referring again to FIGS. 2, 2A and 2B, it can be seen that although journal plugs 38 and 38A do not include a center band, the journal plug 38 on the left hand side includes a circular snap-ring 68 which is positioned in circumferential groove 70 as best seen in FIG. 2A. Also as shown end caps 72 and 72A (which have a circular aperture 74 with substantially the same radius as the radius of end 60 and 60A) are bonded at their edges 76 and 76A to ends 52 and 52A of plastic screw conveyor 20 as indicated by beads 78 and 78A. Thus, it will be appreciated that the combination end cap 72 and plastic screw conveyor 20 will be restrained from moving axially past snap-ring 68. It is important to note, however, that the other end of the conveying apparatus as shown on the right hand side and as mentioned above, does not include a snap-ring. Further, it is assumed that the material being conveyed by the apparatus will move from left to right as indicated by arrow 80 which of course means that there is a resultant force on the screw conveyor to the left as indicated by arrows 82A, 82B and 82C. Thus, it will be appreciated that end cap 72 will be urged against snap-ring 68 during operation.

Under conditions wherein FIG. 2 represents the apparatus at rest and at ambient temperatures, and assuming a substantial increase in temperature during operation, it will be appreciated that the plastic screw conveyor 20 will expand at a greater rate than the combination metal drive shaft 26 and connected journal plugs 38 and 38A. Consequently, it will be appreciated that when drive end cap 72 is against snap-ring 68 and dimensional changes due to temperature increases occur, then the right hand side of screw conveyor 20 having end cap 72A moves to the right with respect to the drive shaft 26 and journal plug 38A as clearly indicated by arrow 84.

Under the opposite conditions wherein FIG. 2 still represents the apparatus at rest and at ambient temperatures, but where there is a substantial decrease in temperature during operation, it will be appreciated that the relative motion between the screw conveyor 20 and the drive shaft 26 and journal plug 38A will be opposite that shown by arrow 84 since the metal drive shaft will not contract as fast as plastic screw conveyor 20. Thus, it will be appreciated that the relative axial motion between the plastic and metal components due to different expansion rates can readily continue until the distance indicated by double headed arrow 86 is traversed, and shoulder 88 of journal plug 38A contacts the inside face 90 of end cap 72A. Once the different expansion rates causes dimension changes which exceed the distance indicated by arrow 86, any further dimension changes will then be accommodated by the complete plastic screw conveyor being moved to the right by shoulder 88 pushing against inside face 90 of end cap 72A. This action will result in end cap 72 being moved away from snap-ring 68. This relative motion can proceed until the continuing dimensional change also exceeds the dimension indicated by double headed arrow 92 located between inside face 94 of end cap 72 and shoulder 96 of journal plug 38.

Thus, it will be appreciated that dimensional changes due to increasing temperatures can continue in the direction of arrow 84 so long as end cap 72 does not run off of round shaft 60A. And dimensional changes due to decreasing temperatures can continue until the change is equal to the sum of the distances equal to both double headed arrows 86 and 92.

Figure 3:
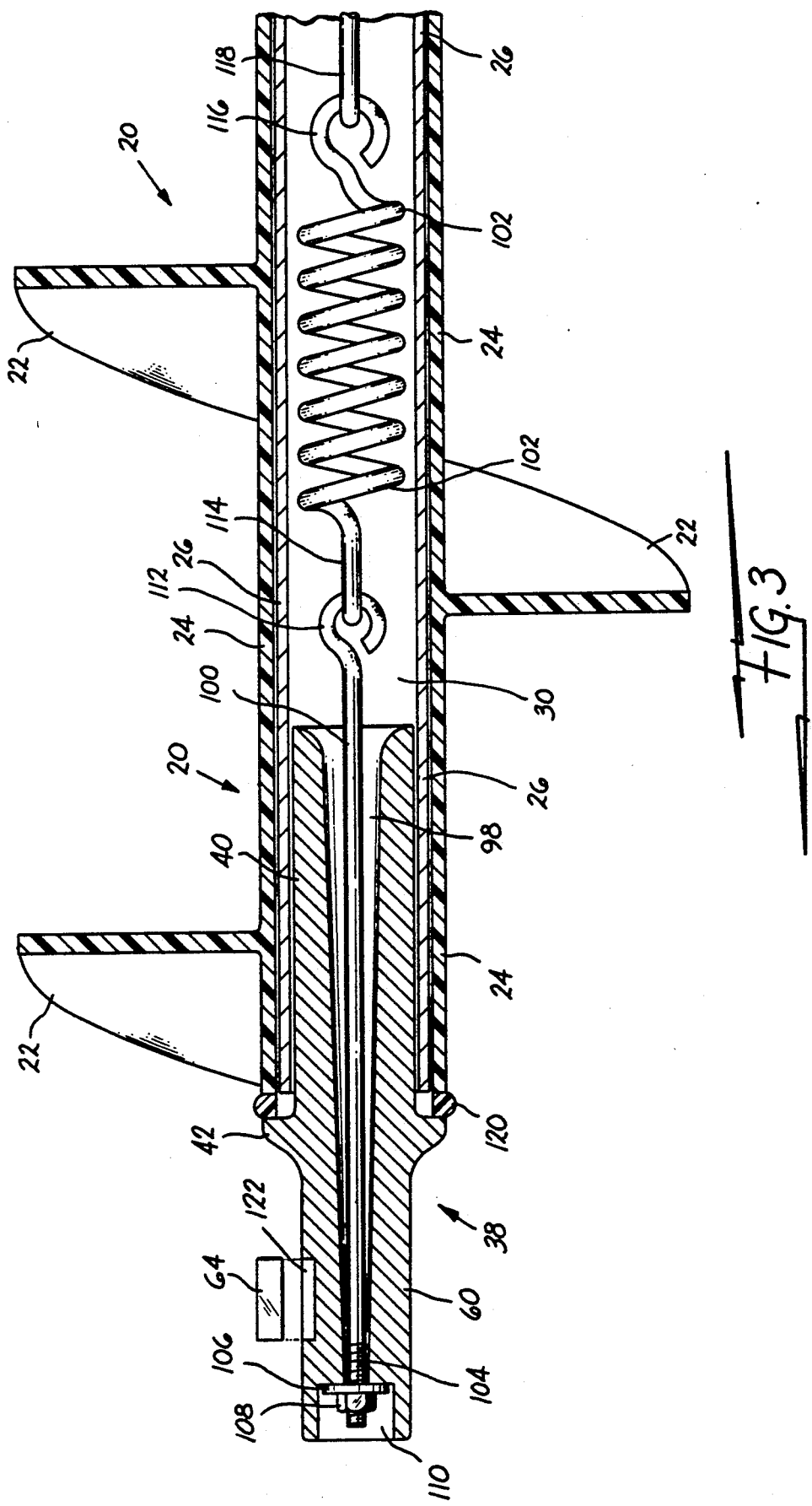
FIG. 3 is a cross-sectional view of another embodiment of the invention showing a different type technique for accommodating dimensional changes between the drive shaft and plastic screw conveyor due to temperature variations.

Referring now to FIG. 3, thee is shown another embodiment of screw conveyor apparatus incorporating features of the present invention. The embodiment as showh has dimensions selected which are particularly suitable for use where the temperature increases during operation. However, it will appreciated by those skilled in the art that the dimensions could readily be selected for use with decreasing temperatures. As shown, the apparatus is at rest and at ambient temperatures. Thus when the temperature increases, the plastic screw conveyor 20 will expand axially faster than the metal drive shaft 26. Extending axially the full length of journal plug 38 is a tapered aperture 98 which receives an elongated eyebolt 100 connected to a tensional spring 102 for retaining mounting end 40 of journal plug 38 in aperture 20 at the end of drive shaft 26. As shown in the embodiment of FIG. 3, elongated eyebolt 100 includes a threaded end 104 which cooperates with a washer 106 and nut 108 to attach the eyebolt to journal plug 38 when tensional forces are applied by spring 102. In the embodiment shown, threaded end 104, washer 106 and nut 108 are located in end recess 110 of the drive end 60 of drive shaft 26. The eye portion 112 located at the opposite end of the elongated center portion of eyebolt 100 is simply hooked to end 114 of spring 102 which as shown is located in the axial aperture of drive shaft 26. The opposite end 116 of spring 102 may be attached to drive shaft 26 by any suitable manner, or preferably attached by a wire 118 to a similar journal plug and eyebolt (not shown) at the other extreme end (not shown) of drive shaft 26. Thus it will be appreciated that journal plug 38 is resiliently mounted within aperture 30 of drive shaft 26 when retained in position in the manner shown in the embodiment of FIG. 3. Also in the embodiment shown, the plastic screw conveyor 20 is sealed in a liquid tight manner to center band 42 of journal plug 38 as indicated by resilient material 120. Thus, as the plastic conveyor expands faster and therefore moves axially with respect to drive shaft 26, journal plug 38 (being in contact with plastic screw conveyor 20) will also slide axially within aperture 30 of drive shaft 26 as the seal is maintained between the plastic screw conveyor and center band 42 of journal plug 38.

Figure 4:
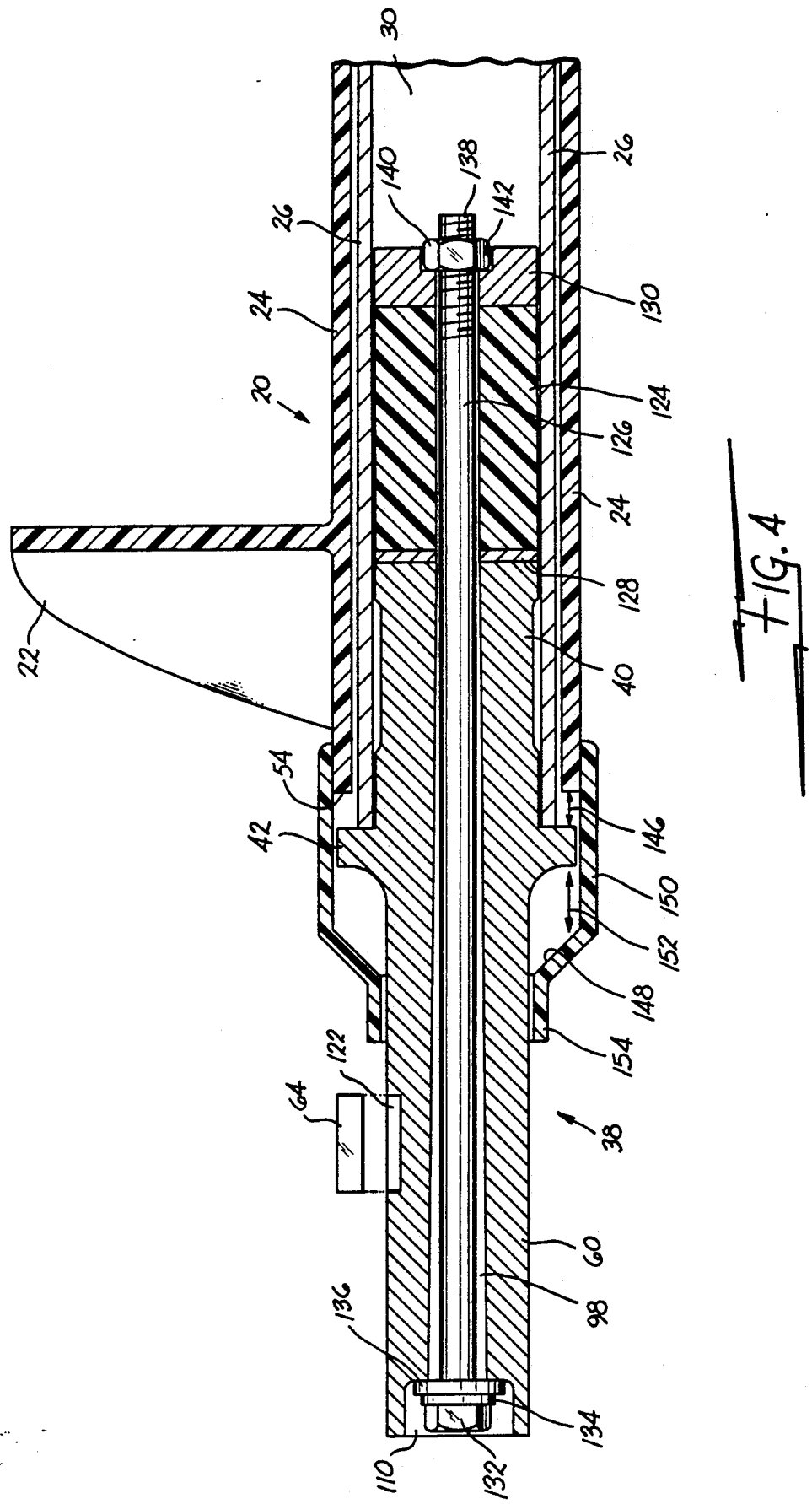
FIG. 4 is yet another embodiment of the conveying apparatus of the present invention.

Referring now to FIG. 4, there is shown another cross-sectional view of yet another embodiment of the present invention wherein the journal plug is maintained in position by a different type of retainer means. The apparatus as shown and as will be discussed hereinafter has dimensions selected for operation with minor increases in temperature from ambient, as well as larger decreases in temperature from ambient. As shown, a plastic screw conveyor 20 is in place around a non-circular drive shaft 26. As was discussed heretofore the axial member 24 of the plastic screw conveyor module 20 defines a non-circular aperture 28 having a cross-section which cooperates with the perimeter cross-section of the drive shaft 26 such that rotation of the drive shaft causes rotation of the plastic screw conveyor.

As was discussed heretofore with respect to the previous embodiments, the drive shaft 26 includes a non-circular aperture 30 which extends the length of drive shaft 26, and journal plug 38 includes a mounting end 40 which cooperates with the aperture 30. In a manner also discussed heretofore, the drive end 60 of journal plug 38 typically has a circular cross-section with a keyway 122 which receives the key 64 such that the journal plug and consequently the drive shaft and plastic screw conveyor may be rotated by a suitable driving mechanism which can impart rotational motion to the drive end of journal plug 38. In a similar manner as was discussed heretofore, journal plug 38 further includes an aperture 98 which extends axially and completely therethrough. However, unlike the embodiment discussed with FIG. 3, instead of an eyebolt joined to a tensional spring, a different technique for securing the journal plug in position in the drive shaft end is shown. As shown, there is located at the mounting end 40 of journal plug 38 a resilient member 124 such as a rubber or plastic member which also has an elongated aperture extending there-through and along the axis thereof. The cross-section of the resilient member 124 taken along a plane perpendicular to the axis of the axial aperture, will be substantially the same as the cross-section of the aperture of drive shaft 26. Further, although in the embodiment shown in FIG. 4 the resilient member 124 is shown as a single elongated member, it will be appreciated that resilient member 124 could comprise a stack of washer-like resilient members placed around elongated bolt 126. In the embodiment shown, there is also included a separation washer 128 which will have a perimeter shape substantially the same as the cross section of aperture 30 of drive shaft 26. In a similar manner, a compression plug 130 is located at the other end of the elongated resilient member 124 and preferably also has a perimeter shape substantially the same as the cross-sectional shape of aperture 30 of drive shaft 26. Further as is clear from the embodiment of FIG. 4, the elongated bolt 126 has a head 132 which is contained in recess 86 of the driving end 60 of journal plug 38. Also as shown, one or more washers 134 provide a bearing surface for the head 132 against shoulder 136 of the elongated aperture 98. At the opposite end of elongated bolt 126, the threaded end 138 receives a standard nut 140 which is held in a nonrotating position by recess 142 defined by compression plug 130. In a typical embodiment, recess 142 will have a cross-sectional shape which cooperates with the perimeter shape of nut 140 such that rotation of the nut within recess 142 is not possible. Thus, when the complete journal plug 38, along with the resilient elongated member 124, the compression plug 130 and the bolt 126 with nut 140 is loosely inserted within aperture 30 of drive shaft 26, it is easily received in a sliding manner. However, once in place by simply tightening bolt head 132 it will be appreciated that the compression plug 130 will compress the resilient member 124 between itself and the separation washer 128. Therefore, the member 124 being compressed axially will in turn significantly expand in a radial direction against the sidewalls of the aperture 30 of drive shaft 26. Thus by forcefully continually tightening the bolt head 132, the axial compression of resilient member 124 accompanied by its radial expansion will securely bind the journal plug and associated components in place such that it cannot be removed from aperture 30. However, if removal is desired it is a matter of simply loosening the bolt 126 with respect to nut 140 to relieve the axial pressures on resilient member 124 such that the radial expansion is relieved and the combination readily removed from the drive shaft.

In this embodiment, it should be noted that the journal plug 38 is secured to drive shaft 26 such that end 144 of the drive shaft is in contact with center band 42. Thus axial movement resulting from increasing temperatures will be limited to the amount indicated by double headed arrow 146 located between the end 54 of plastic screw conveyor 20 and center band 92. Of course, if there is a similar gap between the drive shaft and a journal plug on the opposide end of the apparatus, then the total possible dimensional change due to increasing temperature will be the sum of the dimensions of the two gaps represented by arrow 146 and a similar gap at the opposite end. On the other hand axial dimension changes due to decreasing temperatures may continue for an amount equal to the spacing between center band 42 of journal plug 34 and the inside face 148 of elongated end cap 150 as represented by double headed arrow 152. As shown, end cap 150 is bonded with a liquid tight seal to axial member 24 of plastic screw conveyor 20, but end 154 is free to slide along shaft 60 of journal plug 38. Also, as was discussed above with respect to dimensional changes due to increasing temperatures, if the opposite end of the conveyor apparatus includes similar apparatus with an elongated end cap, then the total allowable dimensional change due to decreasing temperature will be sum of the two gaps between the center band 42 and the inside face of the elongated end caps.

Referring now to FIG. 5, there is shown still another embodiment similar to that shown in FIG. 4, except that instead of a sliding elongated end cap, one end 156 of a flexible sleeve member 158 is secured in a liquid tight manner between the journal plug 38 and the drive shaft 26, while the other end 160 of the sleeve member is bonded in a liquid tight manner to plastic screw conveyor 20 as indicated by bead 162.

Referring now to FIG. 6 there is shown still another embodiment of a coupling means for attaching a journal plug to a conveyor apparatus according to the principles of this invention. The embodiment shown in FIG. 6 is somewhat similar to that discussed heretofore with respect to FIGS. 4 and 5, except that instead of using a resilient compressible member the retaining member is a non-resilient member (typically metal), which because of its structure when tightened in a manner discussed above with respect to FIG. 4 and 5, also expands inside of the drive shaft 26. As shown, the drive end 60 of the journal plug 38 operates substantially the same as discussed heretofore with respect to FIGS. 4 and 5. However, as can be seen the mounting end has a substantially different configuration. It can be seen that there is starting at the end 164 a cross-section which is inclined towards the drive end to a larger cross-sectional. Also as can be seen, there is an axial aperture 98 extending through journal plug 38. Cooperating with the inclined section 164 of the mounting end 40 of journal plug 38, there is a retainer means indicated generally at 166. As can be seen the retaining means 166 has a perimeter outline or cross-section which is substantially the same although slightly smaller than the cross-section of the aperture defined in a cooperating drive shaft (not shown). In the example shown the drive shaft would of course be square. Also as shown, the retainer means 166 includes an incline or ramp area 170 extending from a base portion 172 of the ramp 170 to a top portion 174. Therefore, it will be appreciated that when the retainer 166 is properly located such that that the inclined area 170 receives the inclined shape 164 of the mounting end of journal plug 38, axially expansion or separation of the retainer 166 will occur when the elongated bolt 126 is tightened with respect to nut 140. Thus as shown, the retainer means 166 is placed within the drive shaft of a screw conveyor apparatus with nut 140 loose enough on bolt 126 such that the combination retainer and journal plug readily slides within the aperture. Once in place the bolt 126 is then tightened putting compression forces on the retainer 166 such that the inclined surfaces of the retainer 124 cooperate with the inclined surfaces of the mounting end of journal plug 60 to cause separation and thereby perimeter expansion of the retainer. Tightening of the bolt 126 is then continued until the expansion of retainer 166 securely binds itself against the interior walls of a drive shaft (not shown). Thus it will be appreciated that the operation of this embodiment is similar to that discussed heretofore with respect to FIG. 3 except the retainer 166 takes the place of the resilient member. Also it will be noted that the embodiment of FIG. 6 includes an elongated flexible end cap or sleeve 176 which is bonded at end 178 to axial member 24 of plastic screw conveyor 20 and is secured to the round shaft at end 160 of journal plug 38 in a liquid tight manner by a compression clamp 180 which encircles the sleeve 176. Thus, the metal drive shaft and journal plug are protected from any corrosiive materials which might be conveyed by plastic conveyor 20.

Therefore, although there has been described to this point particular embodiments of screw conveyor apparatus for use with variable temperatures, it is not intended that such references be considered as limitations upon the scope of this invention except insofar as set forth in the following claims.

We claim:

1. Conveying apparatus for use in any environment having variable temperatures including a molded plastic screw conveyor, said plastic screw conveyor including an axial member extending a selected length, and a flight member helically encircling more than 360° of said axial member, and extending said selective length, said apparatus comprising:

a molded plastic screw conveyor having a first coefficient of expansion and including an elongated axial member extending said selected length between a pair of ends, said axial member further defining an aperture having a cross-section of a first non-circular shape extending co-axially therethrough said screw conveyor including a flight member which helically encircles more than 360° of said axial member and extends between said pair of ends;

an elongated drive shaft having a second coefficient of expansion which is different than said first coefficient of expansion, and having a perimeter cross-section of a second non-circular shape extending axially through and cooperating with said aperture of said screw conveyor to allow axial motion between said screw conveyor and said drive shaft so as to accommodate variations in length due to temperature changes, said drive shaft further including an aperture extending co-axially from at least one end of, and into said drive shaft, said aperture and said drive shaft being smaller than said perimeter cross-section and having a cross-section of a third non-circular shape;

a journal plug having a mounting end and a drive end and defining an aperture extending axially therethrough;

a retainer means cooperating with said mounting end of said journal plug and defining an aperture therethrough in register with said journal plug aperture, at least one of said cooperating journal plug and said retainer means defining a perimeter cross-section such that rotation of said journal plug causes rotation of said drive shaft; and attaching means extending through the aperture of said retainer means and the aperture of said journal plug for applying compressive axial force to said cooperating retainer means and journal plug to cause radial expansion of said cooperating retainer means and journal plug within said drive shaft aperture thereby increasing said perimeter cross-section so as to retain said journal plug in said drive shaft aperture.

2. The conveying apparatus of claim 1 wherein said first and second non-circular shapes are substantially the same in size and shape.

3. The conveying apparatus of claim 1 wherein said third non-circular shape is substantially the same in size and shape as said perimeter cross-section of said cooperating means and journal plug.

4. The screw conveying apparatus of claim 1 wherein said journal plug includes an intermediate section between said mounting end and said drive end and has at least one cross-sectional dimension greater than a corresponding cross-sectionsl dimension of said second non-circular shape.

5. The conveying apparatus of claim 1 wherein said mounting end of said journal plug includes an inclined surface extending toward said drive end such that the cross-sectional area of said mounting end increases towards the drive end, and said retainer means includes an inclined surface for cooperating with said inclined surface on said mounting end of said journal plug to cause said expansion.

6. The conveying apparatus of claim 5 wherein said retainer means defines a cross-sectional shape similar to the cross-sectional shape of said drive shaft aperture and comprises two sections.

7. The conveying apparatus of claim 5 wherein said retainer means and said mounting end of said journal plug in combination define a cross-sectional shape similar to the cross-sectional shape of said drive shaft aperture.

8. The conveying apparatus of claim 1 wherein said retainer means define a cross-sectional shape similar to the cross-sectional shape of said drive shaft aperture and is made of resilient material which will expand in a radial direction when subjected to compressive force and then return to substantially its original shape when said compressive force is removed.

9. The conveying apparatus of claim 1, and further comprising means for providing a seal between the extreme end of said molded plastic screw conveyor and said journal plug.

10. The conveying apparatus of claim 1, and further including another journal plug and retaining means and wherein both ends of said drive shaft include apertures so that said journal plugs are retained in said apertures by said retaining means at both ends of said drive shaft.

11. The conveying apparatus of claim 1, and further including at least one end cap having a first portion bonded to the extreme end of said molded plastic screw conveyor, and a second portion encircling the drive end of said journal plugs.

12. The screw conveying apparatus of claim 11, wherein said bond between said end cap and said plastic screw conveyor module provides a substantial liquid type seal and wherein said end cap includes a flexible intermediate portion and said second portion is clamped to said drive end of said journal plug so as to provide a substantial liquid type seal between said screw conveyor and said drive shaft.

* * * * *